(12) United States Patent
Seo et al.

(10) Patent No.: US 9,070,930 B2
(45) Date of Patent: Jun. 30, 2015

(54) ORGANIC/INORGANIC COMPOSITE ELECTROLYTE AND ELECTROCHEMICAL DEVICE PREPARED THEREBY

(75) Inventors: Dae-Jong Seo, Daejeon (KR);
Sang-Young Lee, Daejeon (KR);
Seok-Koo Kim, Daejeon (KR);
Jang-Hyuk Hong, Daejeon (KR)

(73) Assignee: LG Chem, Ltd. (KR)

( * ) Notice: Subject to any disclaimer, the term of this patent is extended or adjusted under 35 U.S.C. 154(b) by 503 days.

(21) Appl. No.: 13/327,976

(22) Filed: Dec. 16, 2011

(65) Prior Publication Data

US 2012/0088029 A1  Apr. 12, 2012

Related U.S. Application Data

(62) Division of application No. 12/223,826, filed as application No. PCT/KR2007/000848 on Feb. 16, 2007, now abandoned.

(30) Foreign Application Priority Data

Feb. 16, 2006 (KR) .................. 10-2006-0015183

(51) Int. Cl.
*B05D 5/12* (2006.01)
*H01M 4/13* (2010.01)
(Continued)

(52) U.S. Cl.
CPC .............. *H01M 4/13* (2013.01); *H01M 2/1673* (2013.01); *H01M 4/0402* (2013.01);
(Continued)

(58) Field of Classification Search
CPC .. B05D 5/12; H01M 10/052; H01M 10/4235; H01M 2004/021; H01M 2/1673; H01M 4/0402; H01M 4/13; H01M 4/131; H01M 4/139; H01M 4/1391
See application file for complete search history.

(56) References Cited

U.S. PATENT DOCUMENTS 5,895,732 A  4/1999 Clough
6,096,453 A  8/2000 Grunwald
(Continued)

FOREIGN PATENT DOCUMENTS

JP  2003016834  1/2003
JP  2003-157823 A  5/2003
(Continued)

OTHER PUBLICATIONS

Augustin et al., "Ceramic but flexible: new ceramic membrane foils for full cells and batteries", Desalination, vol. 146, p. 23 (2002).
(Continued)

*Primary Examiner* — Carlos Barcena
(74) *Attorney, Agent, or Firm* — Lerner, David, Littenberg, Krumholz & Mentlik, LLP

(57) ABSTRACT

The present invention relates to a method for manufacturing an electrode having an organic/inorganic composite porous coating layer comprising porous inorganic particles and a binder polymer, wherein the porous inorganic particles have pores having such a size that lithium ions ($Li^+$) solvated in an electrolyte solvent can pass therethrough. The method comprises the steps of dispersing inorganic precursors and heat-decomposable compounds in a dispersion medium, misting the inorganic precursor solution, and performing a thermal decomposition and a crystallization processes, to thereby prepare porous inorganic particles, adding and mixing the porous inorganic particles to a polymer solution in which a binder polymer is dissolved, and coating the mixture onto a preliminarily formed electrode and drying the coating layer.

12 Claims, 5 Drawing Sheets

(51) Int. Cl.
  *H01M 2/16* (2006.01)
  *H01M 4/04* (2006.01)
  *H01M 4/139* (2010.01)
  *H01M 10/052* (2010.01)
  *H01M 10/42* (2006.01)
  *H01M 4/131* (2010.01)
  *H01M 4/1391* (2010.01)
  *H01M 4/02* (2006.01)

(52) U.S. Cl.
  CPC ............ *H01M 4/131* (2013.01); *H01M 4/139* (2013.01); *H01M 4/1391* (2013.01); *H01M 10/052* (2013.01); *H01M 10/4235* (2013.01); *H01M 2004/021* (2013.01); *Y02E 60/122* (2013.01)

(56) References Cited

U.S. PATENT DOCUMENTS

| | | | |
|---|---|---|---|
| 6,287,728 | B1 | 9/2001 | Kajiura et al. |
| 6,432,586 | B1 | 8/2002 | Zhang |
| 7,790,321 | B2 | 9/2010 | Hennige et al. |
| 2005/0266150 | A1 | 12/2005 | Yong et al. |
| 2006/0134521 | A1 | 6/2006 | Shima |

FOREIGN PATENT DOCUMENTS

| | | |
|---|---|---|
| JP | 2005310697 | 11/2005 |
| KR | 1020070082402 A | 8/1997 |
| KR | 1020070000231 A | 1/2007 |
| TW | 200541135 | 12/2005 |
| WO | 2005031899 A1 | 4/2005 |
| WO | 2005076388 A1 | 8/2005 |

OTHER PUBLICATIONS

Office Action from Chinese Application No. 200780005757.8, dated Apr. 1, 2010.
Office Action from Taiwanese Application No. 96105715 dated Sep. 20, 2010.
Abdullah et al., "Preperation of Oxide Particles with Ordered Macropores by Colloidal Templating and Spray Pyrolysis", ActaMaterialia, Elsevier, vol. 52, Issue 17, Oct. 4, 2004.
H. Ohtaki and H. Wada. Structure of Solvated Lithium and Chloride Ions in Formamide, J. Sol. Chem. 1985, 14(3), 209-219.
H. Yamada; T. Yamato; I. Moriguchi; T. Kudo. Interconnected macroporous $TiO_2$ (anatase) as a lithium insertion electrode material, Solid State Ionics 2004, 175, 195-198.

(a)                                    (b)

ORGANIC/INORGANIC COMPOSITE ELECTROLYTE AND ELECTROCHEMICAL DEVICE PREPARED THEREBY

CROSS-REFERENCE TO RELATED APPLICATIONS

The present application is a divisional application of U.S. patent application Ser. No. 12/223,826, filed Aug. 11, 2008, which is a national phase entry under 35 U.S.C. §371 of International Application No. PCT/KR2007/000848, filed Feb. 16, 2007, published in English, which claims priority from Korean Patent Application No. 10-2006-0015183, filed Feb. 16, 2006, the disclosures of which are incorporated herein by reference.

TECHNICAL FIELD

The present invention relates to an electrode that comprises a coating layer capable of substituting for a separator and ensures improved quality and safety of an electrochemical device, a method for manufacturing the same, and an electrochemical device comprising the same.

BACKGROUND ART

Recently, there is increasing interest in energy storage technology. Batteries have been widely used as energy sources in portable phones, camcorders, notebook computers, PCs and electric cars, resulting in intensive research and development into them. In this regard, electrochemical devices are subjects of great interest. Particularly, development of rechargeable secondary batteries has been the focus of attention.

Among the currently used secondary batteries, lithium secondary batteries, developed in early 1990's, have drive voltage and energy density higher than those of conventional batteries using aqueous electrolytes (such as Ni-MH batteries, Ni—Cd batteries and $H_2SO_4$—Pb batteries), and thus they are spotlighted in the field of secondary batteries. However, lithium secondary batteries have problems related to safety, caused by ignition and explosion due to the use of organic electrolytes, and are manufactured through a complicated process. Lithium ion polymer batteries, appearing more recently, solve the above-mentioned disadvantages of secondary lithium ion batteries, and thus become one of the most potent candidates of the next generation batteries. However, such secondary lithium ion polymer batteries still have low capacity compared to secondary lithium ion batteries. Particularly, they show insufficient discharge capacity at low temperature. Hence, there is an imminent need for the improvement of secondary lithium ion batteries.

Such batteries have been produced by many battery producers. However, most lithium secondary batteries have different safety characteristics depending on several factors. Evaluation of and security in safety of batteries are very important matters to be considered. Particularly, users should be protected from being injured by malfunctioning batteries. Therefore, safety of batteries is strictly restricted in terms of ignition and combustion in batteries by safety standards. Many attempts have been made to solve the problem related to the safety of a battery. However, ignition of a battery, caused by a forced internal short circuit due to external impacts (particularly, in the case of a customer-abused battery) cannot be solved yet.

More fundamentally, currently available lithium ion batteries and lithium ion polymer batteries use polyolefin-based separators in order to prevent short circuit between a cathode and an anode. However, because such polyolefin-based separators use a polymer component having a melting point of 200° C. or less and are subjected to a stretching step for controlling their pore sizes and porosities so as to be used as separators, they have a disadvantage in that they show high heat shrinking property upon exposure to high temperature. In other words, such separators can be shrunk or molten when the temperature of a battery increases due to internal and/or external factors. Therefore, there is a great possibility of short-circuit between a cathode and an anode that are in direct contact with each other due to shrinking or melting of separators, resulting in accidents such as ignition and explosion of a battery caused by rapid emission of electric energy.

To solve the above problems related with polyolefin-based separators, many attempts are made to develop an electrolyte using an inorganic material capable of substituting for a conventional separator.

U.S. Pat. No. 6,432,586 discloses a polyolefin-based separator coated with an inorganic layer, such as calcium carbonate, silica, etc. However, the separator merely using the polyolefin-based polymer cannot provide a significant improvement in the safety of a battery, particularly in terms of the prevention of heat shrinking at high temperature.

Additionally, Creavis Co. (Germany) have developed an organic/inorganic composite separator comprising a non-woven polyester support coated with silica ($SiO_2$) or alumina ($Al_2O_3$). However, in the case of the above separator, the non-woven polyester support cannot provide excellent mechanical and physical properties by nature, and the chemical structure of polyester is liable to electrochemical reactions. Thus, it is thought that the above separator shows many problems in practical use ("Desalination", vol. 146, p. 23 (2002)).

Accordingly, there is an imminent need for developing a separator that can improve the quality and safety of an electrochemical device, or a composite electrolyte that also serves as such a separator.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Technical Problem

Figure 1:
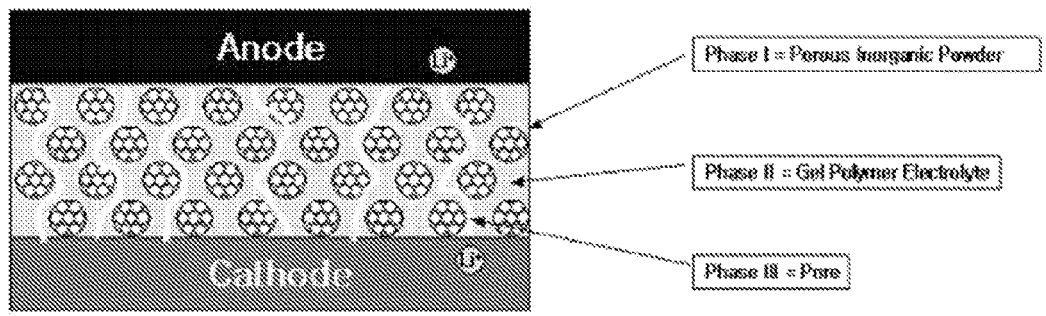
FIG. 1 is a schematic view showing the electrode comprising an organic/inorganic composite porous coating layer according to the present invention and the function thereof in a battery.

The inventors of the present invention have found that an organic/inorganic composite porous coating layer, which is formed by coating a mixture of inorganic particles with a polymer capable of being swelled with an electrolyte directly onto the surface of an electrode, can substitute for a conventional separator, and is firmly bound to an interface between the coating layer and an electrode so as to prevent heat shrinking, resulting in improvement in the safety of an electrochemical device.

However, such inorganic particles should be used in a high proportion in the organic/inorganic composite porous coating layer in order to ensure sufficient safety of the coating layer. The inorganic particles may serve as a resistance layer to lithium ion (Li+) movements, resulting in degradation of the quality of a battery due to a drop in lithium ion conductivity. Additionally, such an increase in the weight of the layer of inorganic particles causes a drop in energy density of a battery per unit weight.

Therefore, the inventors of the present invention have conducted many studies to solve the above problems. According to the present invention, an organic/inorganic composite porous coating layer capable of functioning as a separator is formed on a preliminarily formed electrode, wherein the coating layer comprises porous inorganic particles having a plurality of pores, each pore having such a size that lithium ions (Li$^+$) can pass therethrough.

Technical Solution

An aspect of the present invention provides an electrode whose surface includes an organic/inorganic composite porous coating layer comprising porous inorganic particles and a binder polymer, wherein the porous inorganic particles include pores having such a size that lithium ions (Li+) solvated in an electrolyte solvent can pass therethrough; and an electrochemical device, preferably a lithium secondary battery comprising the same.

Another aspect of the present invention provides a method for manufacturing the electrode having an organic/inorganic composite porous coating layer, the method comprising the steps of: (a) dispersing inorganic precursors and heat-decomposable compounds in a dispersion medium, misting the inorganic precursor solution, and performing a thermal decomposition and a crystallization processes, to thereby prepare porous inorganic particles; (b) adding and mixing the porous inorganic particles to a polymer solution in which a binder polymer is dissolved; and (c) coating the mixture of step (b) onto a preliminarily formed electrode and drying the coating layer.

Hereinafter, the present invention will be explained in more detail.

The present invention is characterized by forming an organic/inorganic composite porous coating layer that also serves as a separator on the substrate of an electrode and by using porous inorganic particles in the coating layer. By doing so, a novel monolithic composite electrode serving not only as a "separator" (that prevents a cathode and an anode from being in direct contact with each other, and provides a path through which lithium ions move) but also as an "electrode" (that is capable of reversible lithium intercalation/deintercalation) is provided according to the present invention.

A separator is interposed between a cathode and an anode to prevent both electrodes from being in direct contact with each other, and provides not only a pathway, through which lithium ions (Li+) move as active components for the electrochemical reactions in a battery, but also a space to be impregnated with an electrolyte capable of conducting lithium ions. The pathway for lithium ions and the space to be impregnated with an electrolyte depend on the pores in a separator. Therefore, pore size and porosity are important factors in controlling ion conductivity in a battery and relate directly to the quality of a battery.

In other words, when lithium ions move between a cathode and an anode, pores in a separator interposed between both electrodes may serve sufficiently as a pathway for the lithium ions as long as they have a diameter equal to or greater than the diameter of a lithium ion. For reference, a lithium ion has a diameter of several angstroms (Å). However, in fact, a lithium ion does not move alone but move in a form solvated with a plurality of molecules of electrolyte, including a carbonate-based compound, functioning as a lithium ion conduction medium. Thus, if a separator merely has a pore size or porosity similar to the diameter of a lithium ion, lithium ion movements and ion conductivity in a battery are degraded, resulting in deterioration of the quality of a battery. For example, when ethylene carbonate (EC), dimethyl carbonate (DMC), etc. is used as an electrolyte, lithium ions move between both electrodes in solvated forms surrounded with four molecules of EC or DMC. In this case, such solvated lithium ions may have a size of about 2 nm or more. Therefore, it is necessary to consider the size of a lithium ion in combination with that of an electrolyte molecule so as to improve the quality of a battery.

Figure 3:
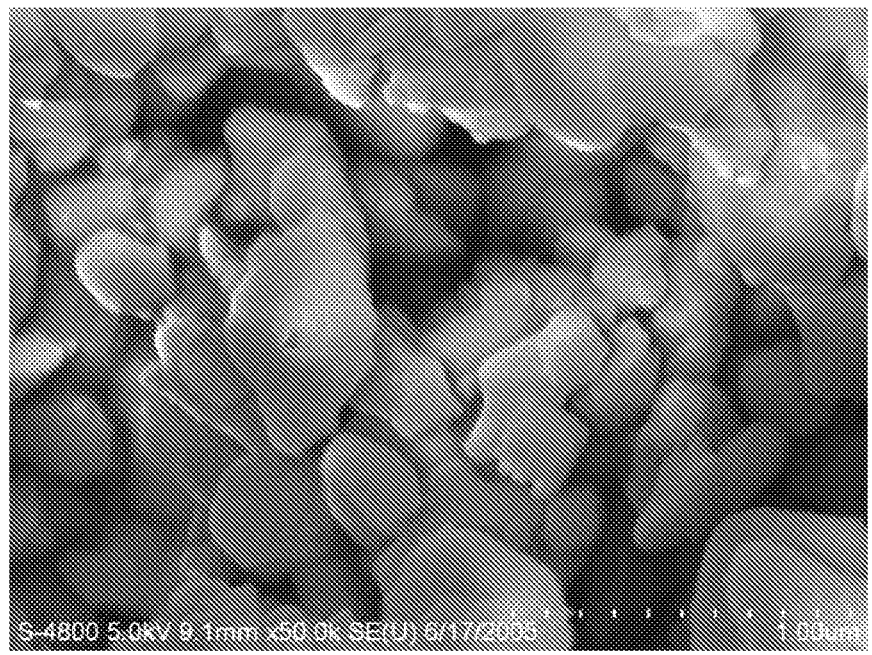
FIG. 3 is a photographic view showing the non-porous inorganic particles used in Comparative Example 1, taken by SEM.
Figure 4:
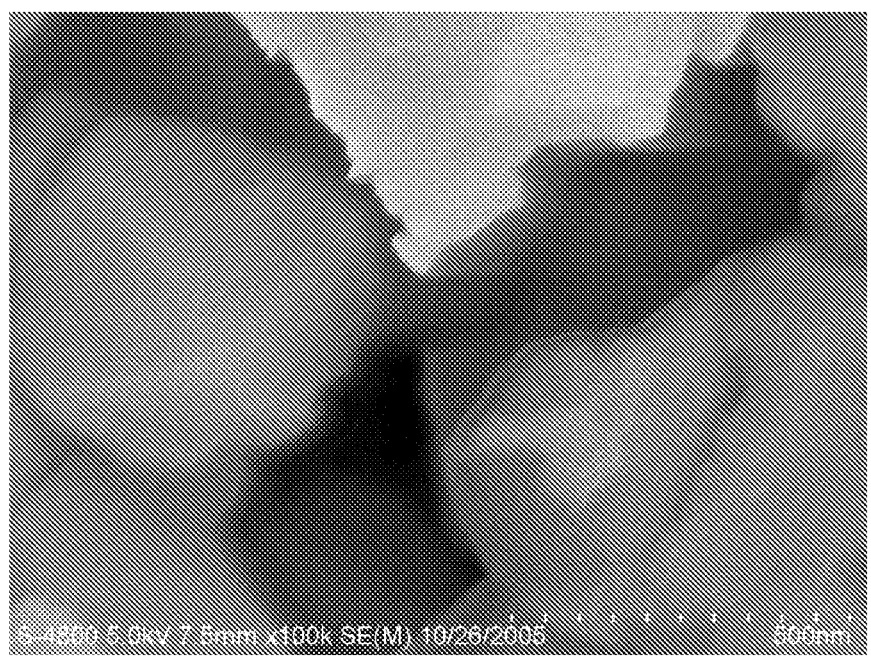
FIG. 4 is a photographic view showing the inorganic particles (zeolite) having micropores (as defined by IUPAC) used in Comparative Example 3, taken by SEM.

However, most inorganic particles introduced into a conventional organic/inorganic composite layer are non-porous inorganic particles (see FIG. 3) having no pores or, if any, having non-uniform micropores with a diameter less than 2 nm (micropores as defined by IUPAC) (see FIG. 4).

Figure 2:
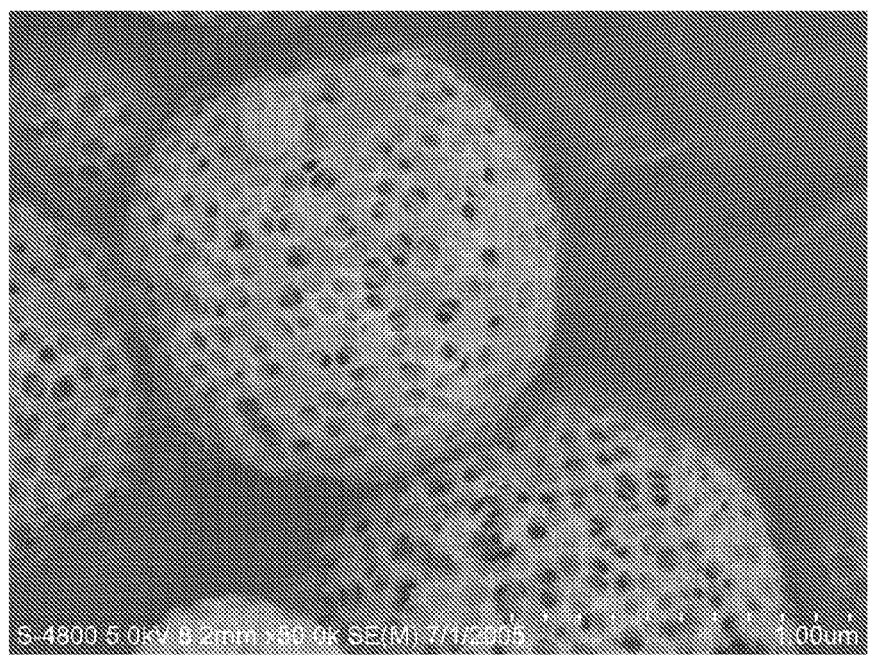
FIG. 2 is a photographic view showing the porous inorganic particles used in Example 1, taken by SEM (scanning electron microscopy)

The organic/inorganic composite porous coating layer according to the present invention is differentiated from the conventional organic/inorganic composite layer in that porous inorganic particles having a uniform pore size and porosity are used and the pore size of the particles is controlled so that lithium ions (Li+) solvated with an electrolyte solvent can pass through the pores (see FIG. 2).

Since the pores present in the porous inorganic particles used according to the present invention have such a size that lithium ions solvated with electrolyte solvent molecules can sufficiently pass therethrough, they can serve as an additional pathway for lithium ions in cooperation with the organic/inorganic composite coating layer serving as a separator. Therefore, lithium ion conductivity in a battery is improved and electrochemical reactions in the battery are activated, so as to obtain the same quality as a battery using a conventional polyolefin-based separator (see the following Table 3). Contrary to a conventional polyolefin-based separator, the organic/inorganic composite porous coating layer does not cause heat shrinking at high temperature (see the following Table 2).

Additionally, while the inorganic particles used according to the prior art serve as a resistance layer interrupting lithium ion movements, the porous inorganic particles show a high degree of swelling with an electrolyte due to a plurality of pores present in the porous inorganic particles and filled with a large amount of electrolyte. Thus, the porous inorganic particles have electrolyte ion conductivity, or increases ion conductivity of the organic/inorganic composite porous coating layer, resulting in improvement in the quality of a battery.

Further, because the organic/inorganic composite porous coating layer uses porous inorganic particles having a plurality of pores, it has a reduced weight, and thus increases the energy density per unit weight of an electrochemical device (see the following Table 1).

Porous Inorganic Particles

There are no particular limitations in composition, porosity or form of the porous inorganic particles that may be used in the present invention, as long as the porous inorganic particles have such a pore size that lithium ions solvated with electrolyte molecules can sufficiently pass therethrough.

The pores preferably include mesopores having an average diameter of 2 nm or more or macropores having an average diameter of 50 nm or more. More preferably, the pores include macropores having an average diameter of between 50 nm and 1 μm. If the pores have a size less than 0.002 μm, the pores are too small to be impregnated with an electrolyte. On the other hand, if the pores have a size greater than 1 μm, the porous inorganic particles having such an increased size may result in an increase in thickness of a finally formed organic/inorganic composite porous coating layer.

For reference, mesopores and macropores mean pores having a pore size of 2~50 nm and 50 nm or more, respectively, as defined by IUPAC (International Union of Pure and Applied Chemistry). Pores having a diameter of less than 2 nm are defined as micropores.

Preferably, the pores are interconnected among themselves so that lithium ions can move through a pore structure present in the inorganic particles.

There is no particular limitation in the porosity of the porous inorganic particles and the porosity may be controlled in a range of 10~95%. Preferably, the porous inorganic particles have a porosity of 50~90%. If the porous particles have a porosity less than 30%, it is not possible to allow the pores present in the porous particles to be sufficiently impregnated with an electrolyte and to improve the quality of a battery. If the porous particles have a porosity greater than 95%, the porous particles may have low mechanical strength.

Additionally, the porous inorganic particles have a significantly increased surface area due to the pores present in the particles, resulting in a drop in density. In fact, when using inorganic particles having a high density, it is difficult to disperse the particles during a coating step. Also, in this case, there is an additional problem in that such high-density particles may result in a battery having an increased weight. Thus, it is preferable that the porous particles have as low a density as possible. For example, the porous inorganic particles have a density of 1~4 g/cc and a surface area of 10~50 m$^2$/g.

Organic/Inorganic Composite Porous Coating Layer

One component of the organic/inorganic composite porous coating layer formed on the surface of the electrode according to the present invention is a binder polymer currently used in the art.

The binder polymers preferably have a glass transition temperature (Tg) as low as possible, more preferably Tg of between −200° C. and 200° C., because they can improve mechanical properties such as flexibility and elasticity of a final coating layer.

When the binder polymer has ion conductivity, it can further improve the performance of an electrochemical device. Therefore, the binder polymer preferably has a dielectric constant as high as possible. In practice, because the dissociation degree of a salt in an electrolyte depends on the dielectric constant of a solvent used in the electrolyte, the polymer having a higher dielectric constant can increase the dissociation degree of a salt in the electrolyte used in the present invention. The dielectric constant of the polymer may range from 1.0 to 100 (as measured at a frequency of 1 kHz), and is preferably 10 or more.

Further, when using a binder polymer having a high degree of swelling with an electrolyte, the binder polymer may absorb the electrolyte infiltrated, and thus the binder polymer can impart electrolyte ion conductivity to the organic/inorganic composite porous coating layer or can improve the electrolyte ion conductivity. More particularly, the surface of the inorganic particles used according to the prior art serves as a resistance layer interrupting lithium ion movements. However, when a binder polymer has a high degree of swelling with an electrolyte on the surface of the porous inorganic particles and/or in the pores formed on the interstitial volumes among the inorganic particles, interfacial resistance generated between the inorganic particles and the electrolyte decreases so that solvated lithium ions can be drawn and moved toward the inside of the pores. Such improved lithium ion conduction can activate electrochemical reactions in a battery and can improve the quality of a battery. Additionally, when binder polymers that can be gelled and swelled with a liquid electrolyte are used, such binder polymers can form a gel type organic/inorganic composite electrolyte through a reaction between the infiltrate electrolyte and the polymer. Such electrolyte demonstrates high ion conductivity and a high degree of swelling, thereby contributing to the improvement of battery performance. Therefore, it is preferable to use a polymer having a solubility parameter between 15 and 45 MPa1/2, more preferably between 15 and 25 MPa1/2, and between 30 and 45 MPa1/2. If the binder polymer has a solubility parameter of less than 15 Mpa1/2 or greater than 45 Mpa1/2, it is difficult for the binder polymer to be swelled with a conventional liquid electrolyte for a battery.

Non-limiting examples of the binder polymer that may be used in the present invention include polyvinylidene fluoride-co-hexafluoropropylene, polyvinylidene fluoride-co-trichloroethylene, polymethylmethacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile-styrene-butadiene copolymer, polyimide or mixtures thereof. Other materials may be used alone or in combination, as long as they satisfy the above characteristics.

The other component of the organic/inorganic composite porous coating layer formed on the surface of an electrode according to the present invention is the porous inorganic particle as described above.

There is no particular limitation in the inorganic particles, as long as they are electrochemically stable. In other words, there is no particular limitation in the porous inorganic particles that may be used in the present invention, as long as they are not subjected to oxidation and/or reduction at the range of drive voltages (for example, 0-5 V vs. Li/Li+) of a battery, to which they are applied. Particularly, it is preferable to use inorganic particles having as high ion conductivity as possible, because such inorganic particles can improve ion conductivity and quality in an electrochemical device. Further, it is preferable to use inorganic particles having a high dielectric constant, because they can contribute to increase the dissociation degree of an electrolyte salt in a liquid electrolyte, such as a lithium salt, thereby improving the ion conductivity of the electrolyte. Therefore, it is preferable to use inorganic particles having a high dielectric constant of 5 or more, preferably of 10 or more, inorganic particles having lithium ion conductivity, or mixtures thereof.

Particular non-limiting examples of inorganic particles having a dielectric constant of 5 or more include: BaTiO3, Pb(Zr,Ti)O3 (PZT), Pb1-xLaxZr1-yTiyO3 (PLZT), PB(Mg3Nb2/3)O3-PbTiO3 (PMN-PT), hafnia (HfO2), Sr TiO3, SnO2, CeO2, MgO, NiO, CaO, ZnO, ZrO2, Y2O3, Al2O3, TiO2, SiC or mixtures thereof.

As used herein, "inorganic particles having lithium ion conductivity" refer to inorganic particles containing lithium elements and having a capability of conducting lithium ions without storing lithium. Inorganic particles having lithium ion conductivity can conduct and move lithium ions due to defects present in their structures, and thus can improve lithium ion conductivity. Non-limiting examples of such inorganic particles having lithium ion conductivity include: lithium phosphate (Li3PO4), lithium titanium phosphate (LixTiy(PO4)3, 0<x<2, 0<y<3), lithium aluminum titanium phosphate (LixAlyTiz(PO4)3, 0<x<2, 0<y<1, 0<z<3), (LiAlTiP)xOy type glass (0<x<4, 0<y<13) such as 14Li2O-9Al2O3-38TiO2-39P2O5, lithium lanthanum titanate (LixLayTiO3, 0<x<2, 0<y<3), lithium germanium thiophosphate (LixGeyPzSw, 0<x<4, 0<y<1, 0<z<1, 0<w<5), such as Li3.25Ge0.25P0.75S4, lithium nitrides(LixNy, 0<x<4, 0<y<2) such as Li3N, SiS2 type glass (LixSiySz, 0<x<3, 0<y<2, 0<z<4) such as Li3PO4-Li2S—SiS2, P2S5 type glass (LixPySz, 0<x<3, 0<y<3, 0<z<7) such as LiI—Li2S—P2S5, or mixtures thereof. Particular examples of the inorganic particles having lithium ion conductivity include (Li0.5La0.5)TiO3, Li2xCa0.5-xTaO3, Li0.2[Ca1-ySry] 0.4TaO3, Li6BaLa2Ta2O12, Li3VO4, Li3PO4/Li4SiO4, Li2S—GeS2-P2S5, Li2S—P2S5, Li2S—GeS2-Ga2S3, Li2S—SiS2, Li2S—P2S5, Li2S—P2S5-SiS2, or the like.

Particularly, among the above-mentioned inorganic particles, BaTiO3, Pb(Zr,Ti)O3 (PZT), Pb1-xLaxZr1-yTiyO3 (PLZT), PB(Mg3Nb2/3)O3-PbTiO3 (PMN-PT) or hafnia (HfO2) has a high dielectric constant of 100 or more and shows piezoelectricity due to electric charges generated upon elongation or compression caused by the application of a predetermined pressure leading to a potential difference between both surfaces. Therefore, such particles having piezoelectricity can prevent an internal short circuit between both electrodes, caused by external impacts, and thus can contribute to improvement in the safety of a battery. Additionally, combination of the inorganic particles having a high dielectric constant with the inorganic particles having lithium ion conductivity can provide a synergic effect.

Although there is no particular limitation in the size of inorganic particles, the inorganic particles preferably have a size of 0.01-10 μm. If the size is less than 0.01 μm, the inorganic particles have poor dispersibility so that the structure and physical properties of the organic/inorganic composite porous coating layer cannot be controlled with ease. If the size is greater than 10 μm, the resultant organic/inorganic composite porous coating layer has an increased thickness under the same solid content, resulting in degradation in mechanical properties. Furthermore, such excessively large pores may increase a possibility of internal short circuit being generated during repeated charge/discharge cycles.

The inorganic particles are present in the mixture of the inorganic particles with the binder polymer forming the organic/inorganic composite porous coating layer, preferably in an amount of 10~99 parts by weight, and more particularly in an amount of 50~95 parts by weight based on 100 parts by weight of the total weight of the mixture. If the content of the inorganic particles is less than 10 parts by weight, the binder polymer is present in such a large amount that the interstitial volumes formed among the inorganic particles are decreased, and thus the pore size and porosity are reduced, resulting in degradation in the quality of a finished battery. If the content of the inorganic particles is greater than 99 parts by weight, the polymer content is too low to provide sufficient adhesion among the inorganic particles, resulting in degradation in mechanical properties of a finally formed organic/inorganic composite porous coating layer.

The organic/inorganic composite porous coating layer according to the present invention may further comprise conventional additives known to those skilled in the art, other than the inorganic particles and the binder.

Although there is no particular limitation in the structure of the organic/inorganic composite porous coating layer formed by coating a mixture of the inorganic particles and the binder polymer onto an electrode substrate, the porous coating layer may have any one of the following two types of structures.

The first embodiment of the porous coating layer according to the present invention comprises the binder polymer layer and the inorganic particles having pores through which lithium ions can pass, the inorganic particles being individually scattered in the binder polymer layer while not being interconnected among themselves. The second embodiment of the porous coating layer according to the present invention comprises the porous inorganic particles interconnected and fixed among themselves by the binder polymer, wherein interstitial volumes among the porous inorganic particles form a porous structure. In a particularly preferred embodiment, porous structures are formed both in the organic/inorganic composite porous coating layer and in the porous inorganic particles.

In the second embodiment, the porous inorganic particles serve not only to form pores by the interstitial volumes among such interconnected inorganic particles but also to maintain the physical shape of the organic/inorganic composite layer as a kind of spacer.

There is no particular limitation in the thickness of the organic/inorganic composite porous coating layer. Also, it is possible to independently control the thickness of each coating layer on a cathode and on an anode. According to the present invention, it is preferable to control the thickness of the coating layer in a range of 1~100 μm, more preferably of 1~30 μm, in order to reduce the internal resistance of a battery.

Additionally, the organic/inorganic composite porous coating layer preferably has a pore size of 0.002~10 μm and a porosity of 5~95%, but is not limited thereto.

According to the present invention, the surface of an electrode may be coated with the mixture of porous inorganic particles and a binder polymer by using a conventional method known to those skilled in the art. In a preferred embodiment of the coating method, the porous inorganic particles are added to and mixed with a polymer solution in which a binder is dissolved, and then the mixture is coated and dried on a preliminarily formed electrode substrate.

Herein, the porous inorganic particles may be prepared according to a typical method used in the art, for example, a self-assembly process, a sol-gel method, a condensation-drying method, a spray pyrolysis method, or a combination thereof. Especially, the spray pyrolysis method is preferred.

According to a preferred embodiment, the porous inorganic particles can be prepared by dispersing inorganic precursors and heat-decomposable compounds in a dispersion medium, misting the inorganic precursor solution, and performing a thermal decomposition and a crystallization processes.

There is no particular limitation in the inorganic precursors, as long as they contain at least one of the typical inorganic components. For instance, in case of preparing alumina, aluminum containing salts such as aluminum nitrate, aluminum chloride, aluminum acetate, aluminum sulfate and the like may be used. Moreover, a nano alumina such as fumed alumina having a stable dispersed phase may also be used as the precursor material.

There is no particular limitation in the heat-decomposable compounds, as long as they are decomposed or pyrolyzed at a temperature lower than the melting temperature of the inorganic particles. Such examples include polymers or foaming agents. In particular, polystyrene is preferred. Although there is no particular limitation in shape of the heat-decomposable compounds either, bead shaped compounds are desired for the formation of uniform pores.

In order to prepare porous particles by the spray pyrolysis method, it is necessary to disperse uniform-sized, heat-decomposable beads (e.g., polystyrene in the present invention) having been prepared in an inorganic precursor solution. Such a precursor solution is misted through a liquid aerosol generator, and droplets thusly obtained then pass through a high-temperature reactor, being subjected to the drying and thermal decomposition processes, and are crystallized to produce inorganic porous particles.

There is no particular limitation in the temperature for the thermal treatment, as long as it is lower than the melting point of the inorganic compound and higher than a decomposition temperature of the heat-decomposable compounds. The heat-decomposable compounds after the thermal treatment are all decomposed in a reactor, and parts filled with the compounds become pores. The resulting inorganic porous particles may have various pore sizes and porosities, depending on size and mixing ratio of the heat-decomposable compounds.

Later, the inorganic porous particles are added and dissolved in a polymer solution. Here, non-limiting examples of the solvent for dissolving polymers include acetone, tetrahydrofuran, methylene chloride, chloroform, dimethylformamide, N-methyl-2-pyrrolidone, cyclohexane, water or mixtures thereof.

It is preferable to perform a step of pulverizing inorganic particles after adding the inorganic porous particles to the prepared polymer solution. Conventional pulverization methods, preferably a method using a ball mill, may be used.

In order to control the pore size, porosity and thickness of the organic/inorganic composite porous coating layer to be formed finally, factors for controlling pores of the separator, such as, the pore size, porosity, size (particle diameter), content of the inorganic porous particle, and a composition (mixing) ratio of the inorganic porous particles to the binder polymer can be properly controlled. For instance, as the weight ratio (I/P) of the inorganic particles (I) to the polymer (P) increases, porosity of the organic/inorganic composite porous coating layer according to the present invention increases. Therefore, the thickness of the organic/inorganic composite porous coating layer increases under the same solid content (weight of the inorganic particles+weight of the binder polymer). Additionally, the pore size increases in proportion to the pore formation among the inorganic particles. When the size (particle diameter) of the inorganic particles increases, interstitial distance among the inorganic particles increases, thereby increasing the pore size.

The mixture of the prepared inorganic porous particles and the binder polymer is coated onto the prepared porous substrate having pores, followed by drying to obtain the organic/inorganic composite porous coating layer of the present invention. Here, as for the coating step, any methods known to one skilled in the art including dip coating, die coating, roll coating, comma coating or combinations thereof may be used.

Since the electrode comprising the organic/inorganic composite porous coating layer according to the present invention is formed by coating the layer directly onto the surface of an electrode substrate including electrode active material particles bound to a collector while forming a pore structure, the electrode active material layer and the organic/inorganic composite porous coating layer can be anchored to each other and firmly bound to each other physically and organically. Therefore, problems related with mechanical properties, such as brittleness, can be improved by virtue of an excellent interfacial adhesion between the electrode substrate and the organic/inorganic composite porous coating layer.

Additionally, the composite electrode according to the present invention comprises: (a) an electrode substrate including electrode active material particles bound to a collector while forming a pore structure; (b) an organic/inorganic composite porous coating layer formed on the electrode substrate and having a pore structure; and porous inorganic particles functioning as a factor for forming the pores of the coating layer and having a plurality of pores therein. Each of the above constitutional elements has a uniform pore structure formed by pores having such a size that lithium ions solvated with electrolyte solvent molecules can pass therethrough (see FIG. 7), and the pore structures are maintained independently from each other, thereby forming a unique triple pore structure. Therefore, when the electrode is swelled with an electrolyte, interfacial resistance can be significantly decreased. Also, the above triple pore structure facilitates lithium ion conduction, thereby minimizing degradation of the quality of a battery (see FIG. 1).

The electrode comprising the organic/inorganic composite porous coating layer according to the present invention may be used not only as an electrode but also as a separator in an electrochemical device, preferably a lithium secondary battery. Particularly, when a polymer capable of being gelled when swelled with a liquid electrolyte is used in the organic/inorganic composite coating layer, the polymer may react with the electrolyte upon the injection of the electrolyte to form a gel type organic/inorganic composite electrolyte.

Further, the present invention provides an electrochemical device comprising a cathode, an anode and an electrolyte, wherein either or both of the cathode and the anode are the electrode comprising the organic/inorganic composite porous coating layer according to the present invention.

Such electrochemical devices include any devices in which electrochemical reactions occur, and particular examples thereof include all kinds of primary batteries, secondary batteries, fuel cells, solar cells or capacitors. Particularly, the electrochemical device is a lithium secondary battery including a lithium metal secondary battery, lithium ion secondary battery, lithium polymer secondary battery or lithium ion polymer secondary battery.

The electrochemical device may be manufactured by a conventional method known to one skilled in the art. In one embodiment of the method for manufacturing the electrochemical device, an electrode assembly having a cathode and an anode is formed, and an electrolyte is injected into the electrode assembly. While the conventional electrochemical device is assembled by inserting a separator between a cathode and an anode, only the electrodes comprising the organic/inorganic composite porous coating layer are used according to the present invention. Therefore, it is possible to simplify the process for manufacturing an electrochemical device according to the present invention.

There are no particular limitations in the cathode, anode and electrolyte that may be applied in combination with the organic/inorganic composite porous coating layer according to the present invention. Any cathodes, anodes and electrolytes generally used in conventional electrochemical devices may be used.

Particularly, because the electrode according to the present invention is a monolithic electrode serving also as a separator, it is not necessary to use a conventional microporous separator. However, the electrode according to the present invention may be applied in combination with a microporous separator depending on the particular use and characteristics of a finished electrochemical device.

BEST MODE FOR CARRYING OUT THE INVENTION

Reference will now be made in detail to the preferred embodiments of the present invention. It is to be understood that the following examples are illustrative only and the present invention is not limited thereto.

Examples 1~3

Example 1

1-1. Preparation of Alumina Porous Inorganic Particles

Figure 8:
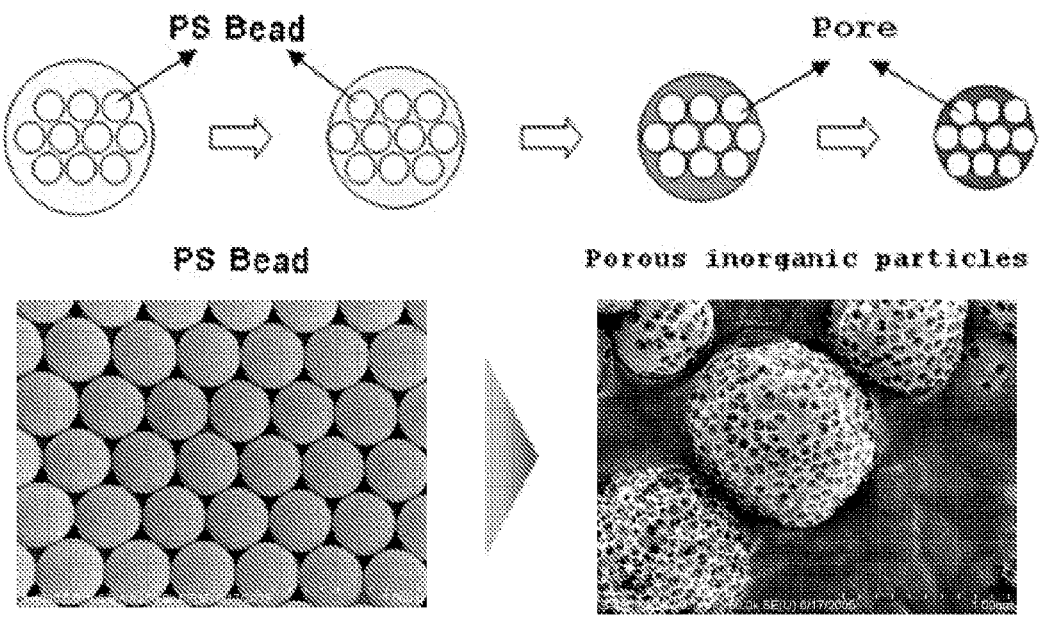
FIG. 8 is a schematic view showing a process for manufacturing porous inorganic particles and the structure of the porous inorganic particles obtained thereby.

Aluminum nitrate, an alumina precursor compound, was dissolved in distilled water as a solvent to a concentration of 0.2M. After aluminum nitrate was completely dissolved in distilled water, preliminarily formed polystyrene beads having a diameter of 100 nm was added to the solution in an amount of 3 parts by weight based on the weight of alumina to be prepared, and the mixture was thoroughly agitated. FIG. 8 is a photographic view of the polystyrene beads taken by SEM. The precursor solution obtained as described above was introduced into a spray pyrolysis system to provide porous alumina inorganic particles. FIGS. 2 and 8 are photographic views of the porous alumina particles taken by SEM.

1-2. Manufacture of Electrode Comprising Organic/Inorganic Composite Porous Coating Layer To N-methyl-2-pyrrolidone (NMP) as a solvent, 96 wt % of carbon powder as an anode active material, 3 wt % of PVdF (polyvinylidene fluoride) as a binder and 1 wt % of carbon black as a conductive agent were added to form mixed slurry for an anode. The slurry was coated on Cu foil having a thickness of about 10 μm as an anode collector, and then dried to form an anode. Then, the anode was subjected to roll press.

To N-methyl-2-pyrrolidone (NMP) as a solvent, 92 wt % of lithium cobalt composite oxide as a cathode active material, 4 wt % of carbon black as a conductive agent and 4 wt % of PVDF as a binder were added to form slurry for a cathode. The slurry was coated on Al foil having a thickness of about 20 μm as a cathode collector, and then dried to form a cathode. Then, the cathode was subjected to roll press.

Electrode Surface Coating

About 5 wt % of PVdF-CTFE polymer (polyvinylidene fluoride-chlorotrifluoroethylene copolymer) having a solubility parameter of 20~25 MPa$^{1/2}$ was added to acetone and dissolved therein at 50° C. for about 12 hours or more to provide a polymer solution. To the preformed polymer solution, the porous $Al_2O_3$ powder having an average pore size of 100 nm and a porosity of 50% (see FIG. 2) and obtained as described in Example 1-1 was added in an amount of 20 wt % on the solid content basis, and the porous $Al_2O_3$ powder was pulverized and dispersed by using a ball mill for 12 hours or more to provide slurry. In the slurry, particle diameter of the porous $Al_2O_3$ particles may be controlled according to the size (particle size) of the beads and the ball milling time. In this example, the porous $Al_2O_3$ particles are pulverized into a size of about 1 μm to provide slurry. Then, the slurry was coated onto surfaces of the preliminarily formed cathode and anode to a thickness of about 15 μm via a dip coating process and the coating layer was dried to provide electrodes comprising an organic/inorganic composite porous coating layer.

Figure 6:
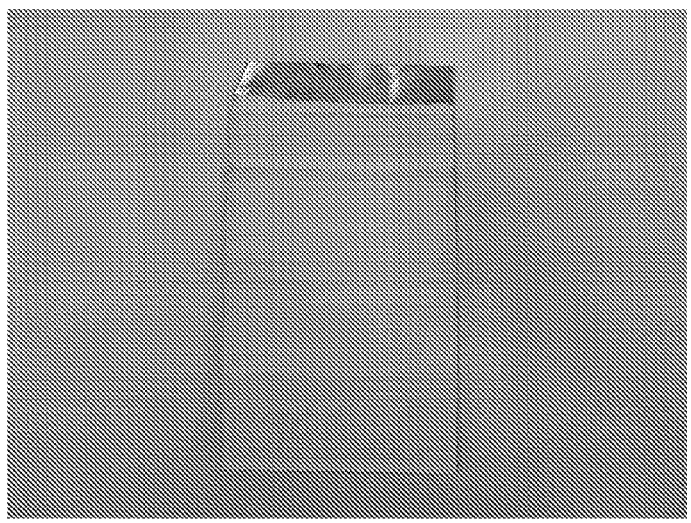
FIG. 6 is a photographic view showing the electrode comprising an organic/inorganic composite porous coating layer according to the present invention.
Figure 7:
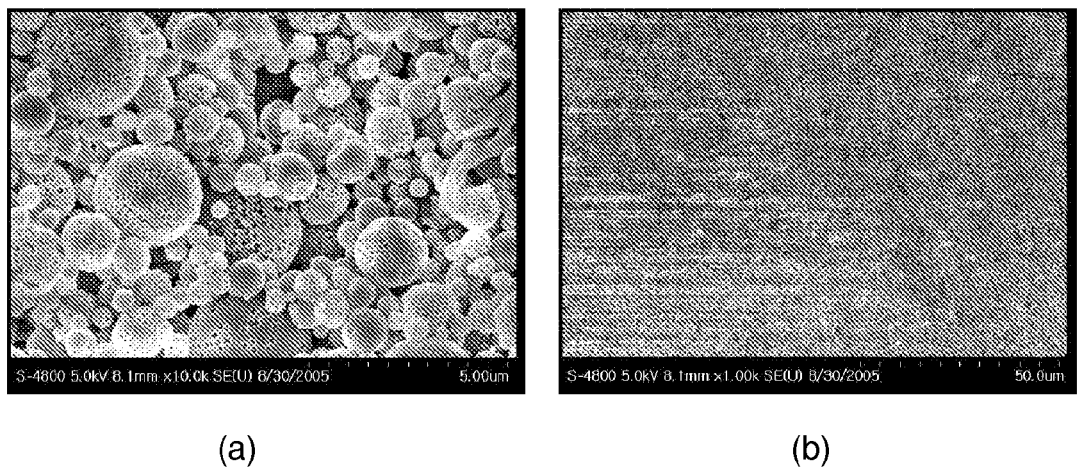
FIG. 7 is photographic view showing the surface of the electrode comprising an organic/inorganic composite porous coating layer according to the present invention, taken by SEM.

FIGS. 6 and 7 are a photograph of the electrode comprising the organic/inorganic composite porous coating layer using porous particles and a photographic view of the surface of the electrode, respectively, taken by SEM. After measuring the pore size and porosity by using a porosimeter, the organic/inorganic composite porous coating layer formed on the electrode had a pore size of 0.49 μm, a porosity of 77.5% and the structure as shown in FIG. 7.

1-3. Manufacture of Lithium Secondary Battery

The anode and the cathode obtained as described in Example 1-2 were stacked to provide an electrode assembly, and an electrolyte comprising 1M lithium hexafluorophosphate ($LiPF_6$) in EC, PC and DEC in a weight ratio of 30/20/50 (EC/PC/DEC) was injected thereto to provide a lithium secondary battery.

Example 2

Example 1 was repeated to provide an electrode comprising an organic/inorganic composite porous coating layer (PVdF-HFP/porous $Al_2O_3$) and a lithium secondary battery using the same, except that PVDF-HFP having a solubility parameter of 22~30 MPa$^{1/2}$ was used instead of PVDF-CTFE. After measuring the pore size and porosity by using a porosimeter, the organic/inorganic composite porous coating layer formed on the electrode had a pore size of 0.51 μm and a porosity of 62%.

Example 3

Example 1 was repeated to provide an electrode comprising an organic/inorganic composite porous coating layer (PVdF-CTFE/$TiO_2$) and a lithium secondary battery using the same, except that porous $Al_2O_3$ powder was substituted with porous $TiO_2$ powder having the same pore size and porosity as porous $Al_2O_3$ powder. After measuring the pore size and porosity by using a porosimeter, the organic/inorganic composite porous coating layer formed on the electrode had a pore size of 0.37 μm and a porosity of 65%.

Comparative Examples 1~3

Comparative Example 1

An electrode and a lithium secondary battery were provided in the same manner as described in Example 1, except that porous particles were not used but non-porous particles (see FIG. 3) having the same composition were used. After measuring the pore size and porosity by using a porosimeter, the organic/inorganic composite porous coating layer formed on the electrode had a pore size of 0.43 μm and a porosity of 46.8%.

Comparative Example 2

A lithium secondary battery was provided in the same manner as described in Example 1, except that conventional electrodes and a PP/PE/PP separator were used instead of the organic/inorganic composite porous coating layer.

Figure 5:
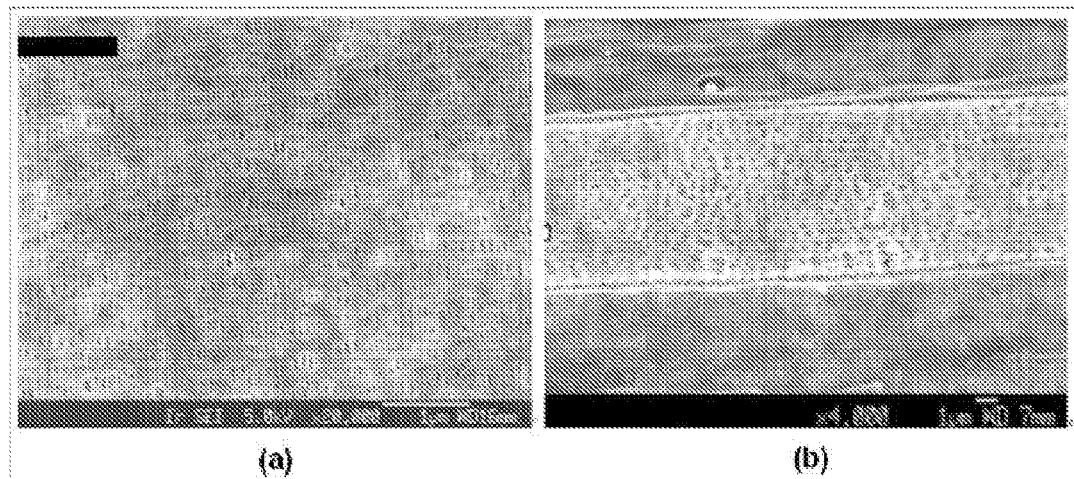
FIG. 5 is a photographic view showing the surface (5a) and the section (5b) of a conventional polyolefin-based separator, taken by SEM.

FIGS. 5a and 5b are photographic views showing the surface and section of the PP/PE/PP separator, taken by SEM, and the separator had a porosity of about 35%.

Comparative Example 3

Example 1 was repeated to provide an electrode comprising an organic/inorganic composite porous coating layer and a lithium secondary battery using the same, except that zeolite having a pore size of 1 nm and a porosity of 33% was used instead of the porous inorganic particles ($Al_2O_3$). FIG. 4 is a photographic view of the zeolite having a pore size of 1 nm, taken by SEM.

After measuring the pore size and porosity by using a porosimeter, the organic/inorganic composite porous coating layer formed on the electrode had a pore size of 0.37 μm and a porosity of 65%.

Experimental Example 1

Characterization of Porous Inorganic Particles

The following test was carried out to characterize the porous inorganic particles ($Al_2O_3$) used in Examples 1 and 2.

As controls, non-porous $Al_2O_3$ having the same composition of the porous particles and used in Comparative Example 1, and zeolite of Comparative Example 3 were used.

First, the particles were observed for their shapes via SEM (scanning electron microscopy). After the observation, the non-porous $Al_2O_3$ particles used in Comparative Example 1 had no pores and were present in an irregular form (see FIG. 3). Even if the zeolite used in Comparative Example 3 had pores, it could be seen that the pores were too small to be observed by SEM (see FIG. 4). On the contrary, the porous $Al_2O_3$ particles used in the examples according to the present invention had a spherical particle shape and included pores both on the surfaces thereof and inside thereof (see FIGS. 2 and 8).

The above morphological characteristics can be determined by surface area analysis. After determining the surface area of each particle via a nitrogen adsorption method, the non-porous Al2O3 particles used in Comparative Example 1 had a surface area as low as 6.4 m2/g, while the porous Al2O3 particles used in Examples 1 and 2 had a surface area of 33.9 m2/g (see Table 1), which was increased by about 5 times as compared to the surface area of the non-porous particles. It can be estimated that such an increase in surface area results from the pores present in the porous Al2O3 particles.

Experimental Example 2

Characterization of Organic/Inorganic Composite Porous Coating Layer

The following test was performed to carry out surface analysis of the organic/inorganic composite porous coating layer formed on the electrode according to the present invention.

2-1. Surface Analysis (SEM)

The composite electrode comprising a porous Al2O3/PVdF-CTFE coating layer according to Example 1 was subjected to surface analysis.

When analyzed by using a Scanning Electron Microscope (SEM), the composite electrode according to Example 1 showed uniform pore structures formed of pores having a size of 1 μm or less both in the electrode substrate and in the organic/inorganic composite porous coating layer comprising Al2O3 particles (see FIG. 7). Also, it could be seen that the porous particles had pores therein.

2-2. Analysis of Physical Properties

The composite electrode comprising a porous Al2O3/PVdF-CTFE coating layer according to Example 1 was used as a sample. As controls, used were the composite electrode comprising a non-porous Al2O3/PVdF-CTFE coating layer according to Comparative Example 1, the conventional polyethylene separator according to Comparative Example 2, and the electrode comprising an organic/inorganic composite porous coating layer using zeolite having micropores (as defined by IUPAC) with a pore size of about 1 nm according to Comparative Example 3.

The following Table 1 shows the characteristics of the organic/inorganic composite porous coating layer of Example 1 as compared to those of the coating layers of Comparative Examples 13 having the same thickness. As can be seen from Table 1, the organic/inorganic composite porous coating layer using porous inorganic particles according to Example 1 has a weight per unit area corresponding to a half or less of the weight per unit area of the organic/inorganic composite porous coating layer using non-porous inorganic particles according to Comparative Example 1. Also, as compared to the coating layer of Comparative Example 1, the composite porous coating layer of Example 1 has a higher porosity and higher ion conductivity (see Table 1). Particularly, the organic/inorganic composite porous coating layer shows a higher pore size and porosity as compared to Comparative Example 3 including a porous coating layer having micropores with a size of 1 nm.

Further, each of the sample and controls was measured for ion conductivity. Herein, ion conductivity was measured via AC impedance determination by disposing the composite electrodes or separator according to Example 1 and Comparative Examples 1-3 between SUS (stainless steel) electrodes having a unit area, allowing the separator or composite electrodes to be sufficiently swelled with an electrolyte, and by sealing the separator or composite electrodes with SUS electrodes while they were in close contact with each other. In fact, it can be seen that the organic/inorganic composite porous coating layer using porous inorganic particles according to Example 1 has excellent ion conductivity (see Table 1). This demonstrates that pores formed by interstitial volumes among the inorganic particles in the organic/inorganic composite porous coating layer, as well as a pore structure present in the porous inorganic particles facilitates movements and conduction of solvated lithium ions, resulting in a significant improvement in ion conductivity. Therefore, it can be expected that such improved ion conductivity results in improvement in the quality of a battery.

TABLE 1

|  | Ex. 1 | Comp. Ex. 1 | Comp. Ex. 2 | Comp. Ex. 3 |
|---|---|---|---|---|
| BET surface area (inorganic particles) | 33.9 | 6.4 |  | 90 |
| Density (inorganic particles) | 2.71 | 4.08 |  | 2.2 |
| Coating layer thickness (μm) | 5 | 5 | — | 5 |
| Coating layer weight (g/m2) | 3.94 | 8.4 | — | 5.4 |
| Porosity (%) | 77.5 | 46.8 | 35 | 65 |
| Ion conductivity (S/cm) | 4.8 × 10-4 | 2.5 × 10-4 | 2.0 × 10-4 | 2.8 × 10-4 |

2-3. Analysis of Interrelation between Porous Inorganic Particles and Organic/Inorganic Composite Porous Coating Layer The composite electrode comprising a porous Al2O3/PVdF-CTFE coating layer according to Example 1 was used as a sample.

Figure 9:
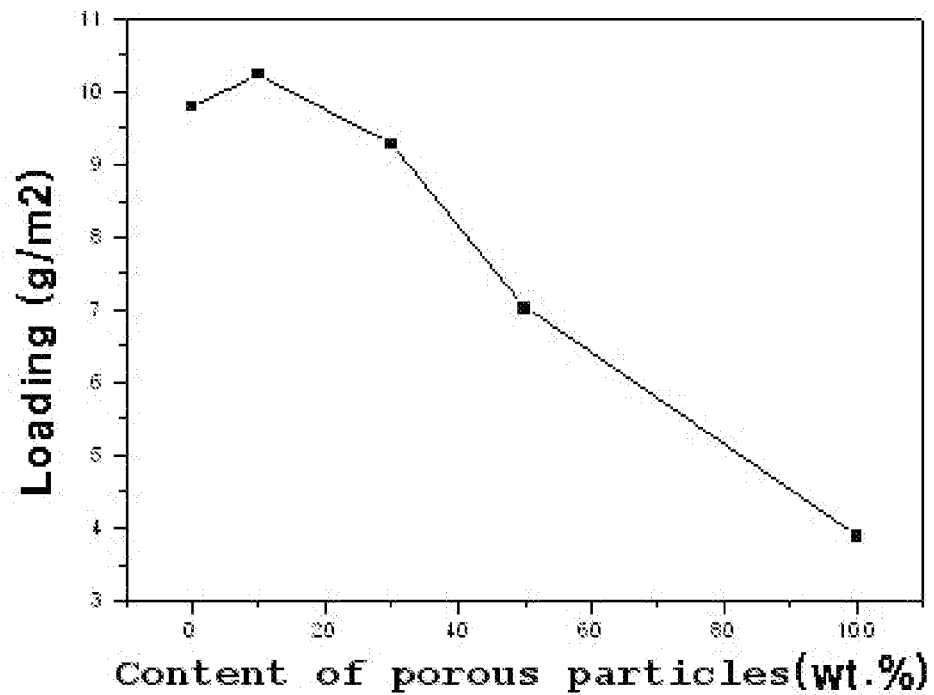
FIG. 9 is a graph showing variation in loading amount of organic/inorganic composite porous coating layer on the content ratio of porous inorganic particles.
Figure 10:
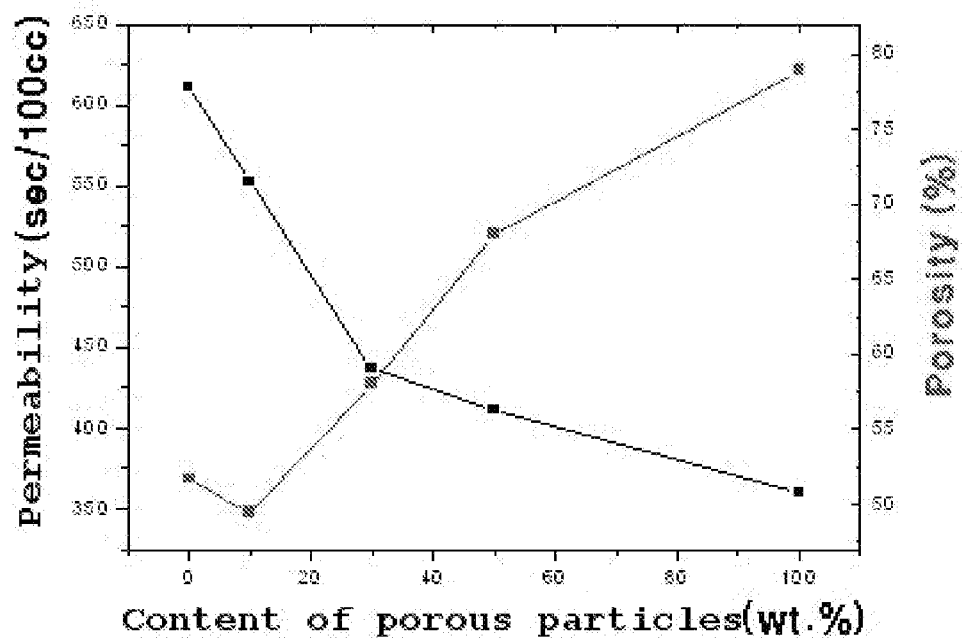
FIG. 10 is a graph showing variation in permeability/porosity of an organic/inorganic composite porous coating layer depending on the content ratio of porous inorganic particles.

The organic/inorganic composite porous coating layer was determined for physical properties, for example, loading amount, air permeability and porosity, as a function of the content of porous inorganic particles. After the determination, it can be seen that the weight of the organic/inorganic composite coating layer decreases as the content of the porous inorganic particles increases based on 100 wt % of the mixture of the binder polymer and the porous inorganic particles forming the coating layer (see FIG. 9). Additionally, it can be seen that the porosity of the organic/inorganic composite porous coating layer increases while the air permeability thereof decreases as the content of the porous inorganic particles increases (see FIGS. 9 and 10).

Experimental Example 3

Evaluation for Shrinkage of Electrode

To evaluate the shrinkage of an electrode at high temperature, the electrode according to Example 1 was used as a sample, and the electrode according to Comparative Example 1 and the PP/PE/PP separator according to Comparative Example 2 were used as controls.

Each of the sample and controls was checked for its heat shrinkage after stored at a high temperature of 150° C. for 1 hour. The polyolefin-based separator of Comparative Example 2 provided a heat shrinkage of about 60% and showed severe shrinkage along the direction to which a tensile force is applied during the manufacture of the separator (see Table 2). On the contrary, the electrodes comprising an organic/inorganic composite porous coating layer according to Example 1 and Comparative Example 1 showed no shrinkage before and after the storage at high temperature.

TABLE 2

|  | Ex. 1 | Comp. Ex. 1 | Comp. Ex. 2 |
|---|---|---|---|
| Shrinkage | 0% | 0% | 60% |

Experimental Example 4

Evaluation for Quality of Lithium Secondary Battery

The following test was performed in order to evaluate the quality of each lithium secondary battery according to Example 1 and Comparative Examples 1 and 2 by measuring the capacity and C-rate characteristics of each battery.

Each battery having a capacity of 760 mAh was subjected to cycling at a discharge rate of 0.2 C, 0.5 C, 1 C and 2 C. The following Table 3 shows the discharge capacity of each battery, the capacity being expressed on the basis of C-rate characteristics.

After the test, it can be seen that the lithium secondary battery using porous inorganic particles according to Example 1 shows excellent C-rate characteristics as compared to the battery using conventional non-porous particles according to Comparative Example 1. Also, the battery according to Example 1 is comparable to the battery using a conventional separator according to Comparative Example 2 in terms of C-rate characteristics (see Table 3).

TABLE 3

|  | Ex. 1 (mAh) | Comp. Ex. 1 (mAh) | Comp. Ex. 2 (mAh) |
|---|---|---|---|
| 0.2 C | 760 | 755 | 759 |
| 0.5 C | 757 | 751 | 757 |
| 1 C | 744 | 739 | 745 |
| 2 C | 694 | 686 | 695 |

Experimental Example 5

Evaluation for Safety of Lithium Secondary Battery

The following test was performed to evaluate the safety of each lithium secondary battery according to Example 1 and Comparative Examples 1 and 2. Each battery was stored at a high temperature of 150° C. and 160° C. for 1 hour. Table 4 shows the conditions of each battery after the storage.

After the test, each battery using an electrode comprising an organic/inorganic composite porous coating layer according to Example 1 and Comparative Example 1 causes no ignition or combustion under high-temperature storage conditions regardless of the porosity of the inorganic particles forming the organic/inorganic composite porous coating layer, and thus shows excellent safety. However, the battery using a conventional separator according to Comparative Example 2 causes ignition and combustion under the same conditions (see Table 4).

TABLE 4

|  | Hot Box (° C./1 hr) | |
|---|---|---|
|  | 150° C. | 160° C. |
| Ex. 1 | Pass | Pass |
| Comp. Ex. 1 | Pass | Pass |
| Comp. Ex. 2 | Failure | Failure |

INDUSTRIAL APPLICABILITY

As can be seen from the foregoing, the organic/inorganic composite porous coating layer according to the present invention capable of substituting for a conventional separator uses porous inorganic particles having pores through which lithium ions can pass. Thus, the organic/inorganic composite porous coating layer according to the present invention has an additional pathway for lithium ion conduction and an additional space to be impregnated with an electrolyte, resulting in improvement in the quality of a battery. Also, the organic/inorganic composite porous coating layer according to the present invention has a decreased weight, and thus can increase energy density per unit weight. Further, the organic/inorganic composite porous coating layer according to the present invention causes no heat shrinkage under high-temperature storage conditions and prevents an internal short circuit between a cathode and an anode even under high-temperature storage conditions, and thus can improve the safety of an electrochemical device.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method for manufacturing an electrode having an organic/inorganic composite porous coating layer comprising porous inorganic particles and a binder polymer, wherein the porous inorganic particles have pores having such a size that lithium ions ($Li^{3+}$) solvated in an electrolyte solvent can pass therethrough, the method comprising the steps of:
   (a) dispersing inorganic precursors and heat-decomposable compounds in a dispersion medium, misting the inorganic precursor solution, and performing a thermal decomposition and a crystallization processes, to thereby prepare the porous inorganic particles, wherein the porous inorganic particles have pores with an average diameter of 50 nm to 1 μm, wherein at least some of the inorganic particles have lithium ion conductivity;
   (b) adding and mixing the porous inorganic particles to a polymer solution in which the binder polymer is dissolved; and
   (c) coating the mixture of step (b) onto a preliminarily formed electrode and drying to form the organic/inorganic composite porous coating layer on the electrode.

2. The method as claimed in claim 1, wherein heat-decomposable compounds are polymer or foaming agent decomposed or pyrolyzed at a temperature lower than a melting point of the inorganic precursors.

3. The method as claimed in claim 1, wherein the thermal decomposition of step (a) is performed at a temperature lower than the melting point of the inorganic precursors and higher than a decomposition temperature of the heat-decomposable compounds.

4. The method as claimed in claim 1, wherein the pores in the porous inorganic particles are interconnected among themselves.

5. The method as claimed in claim 1, wherein the porous inorganic particles have a porosity of 30 to 95%.

6. The method as claimed in claim 1, wherein the porous inorganic particles have a density of 1 to 4 g/cc and a surface area of 10 to 50 $m^2$/g.

7. The method as claimed in claim 1, wherein the organic/inorganic composite porous coating layer is formed by coating a mixture of the porous inorganic particles and the binder polymer onto a surface of an electrode comprising electrode active material particles bound to a collector while forming a pore structure, wherein the porous inorganic particles are interconnected and fixed among themselves by the binder polymer, and interstitial volumes among the porous inorganic particles form a pore structure.

8. The method as claimed in claim 1, wherein the organic/inorganic composite porous coating layer serves as a separator preventing a cathode and an anode from being in direct contact with each other and permitting lithium ions ($Li^+$) to pass therethrough.

9. The method as claimed in claim 1, wherein some of the porous inorganic particles have a dielectric constant of 5 or more.

10. The method as claimed in claim 1, wherein the porous inorganic particles have a size of 0.01 to 10 μm.

11. The method as claimed in claim 1, wherein the binder polymer has a solubility parameter of 15 to 45 $MPa^{1/2}$.

12. The method as claimed in claim 1, wherein the porous inorganic particles and the binder polymer are used in a weight ratio of 10:90 to 99:1.

* * * * *